US011522757B2

(12) United States Patent
Tsunekawa

(10) Patent No.: US 11,522,757 B2
(45) Date of Patent: Dec. 6, 2022

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Kiyohiro Tsunekawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/205,064

(22) Filed: Mar. 18, 2021

(65) Prior Publication Data
US 2021/0203553 A1 Jul. 1, 2021

Related U.S. Application Data

(62) Division of application No. 16/255,946, filed on Jan. 24, 2019, now Pat. No. 11,044,152.

(30) Foreign Application Priority Data

Jan. 25, 2018 (JP) .............................. JP2018-010834

(51) Int. Cl.
H04L 12/24 (2006.01)
H04L 12/28 (2006.01)
(Continued)

(52) U.S. Cl.
CPC ...... H04L 41/0813 (2013.01); H04L 41/0879 (2013.01)

(58) Field of Classification Search
CPC ....................... H04L 41/0813; H04L 41/0879
See application file for complete search history.

(56) References Cited

U.S. PATENT DOCUMENTS 6,393,031 B1* 5/2002 Isomura .............. H04L 12/5692
370/444
7,725,775 B2 5/2010 Tsuzuki
(Continued)

FOREIGN PATENT DOCUMENTS

JP 2004005544 A 1/2004
JP 2006050587 A 2/2006
(Continued)

OTHER PUBLICATIONS

Office Action issued in U.S. Appl. No. 16/255,946 dated Jan. 24, 2020.

(Continued)

Primary Examiner — Christopher B Robinson
(74) Attorney, Agent, or Firm — Rossi, Kimms & McDowell LLP

(57) ABSTRACT

An information processing apparatus that outputs data to an outside through a connected network includes a plurality of communication interfaces connected to a plurality of different networks, at least one service providing unit for outputting the data, interface selection information for associating the service providing unit with the communication interface, and an output unit for outputting the data from a communication interface corresponding to a type of the service providing unit by referring to the interface selection information.

9 Claims, 10 Drawing Sheets

(51) Int. Cl.
*H04W 48/18* (2009.01)
*H04L 41/0813* (2022.01)
*H04L 41/08* (2022.01)

(56) References Cited

U.S. PATENT DOCUMENTS

| | | | |
|---|---|---|---|
| 2003/0081742 | A1 | 5/2003 | Czyszczewski |
| 2004/0002905 | A1* | 1/2004 | Oya ............... G06Q 10/087 705/28 |
| 2006/0002352 | A1 | 1/2006 | Nakamura |
| 2007/0064683 | A1* | 3/2007 | Furukawa .......... H04N 1/00244 370/352 |
| 2007/0087778 | A1* | 4/2007 | Otsuka ................ H04L 41/082 455/550.1 |
| 2013/0110995 | A1 | 5/2013 | Kwon |
| 2014/0211246 | A1 | 7/2014 | Okuno |
| 2014/0333958 | A1* | 11/2014 | Oshima ............ H04N 1/32797 358/1.15 |
| 2016/0149723 | A1* | 5/2016 | DeCesaris ......... H04L 12/40143 710/305 |
| 2019/0354329 | A1 | 11/2019 | Amarendra |

FOREIGN PATENT DOCUMENTS

| | | |
|---|---|---|
| JP | 2006067105 A | 3/2006 |
| JP | 2007088954 A | 4/2007 |
| JP | 2007094455 A | 4/2007 |
| JP | 2011082599 A | 4/2011 |
| JP | 2014146205 A | 8/2014 |
| JP | 2014220607 A | 11/2014 |
| WO | WO-2012053049 A1 * | 4/2012 ......... H04L 12/5692 |

OTHER PUBLICATIONS

Office Action issued in U.S. Appl. No. 16/255,946 dated Aug. 18, 2020.
Notice of Allowance issued in U.S. Appl. No. 16/255,946 dated Dec. 2, 2020.
Notice of Allowance issued in U.S. Appl. No. 16/255,946 dated Apr. 5, 2021.
Office Action issued in Japanese Application No. 2018-010834 dated Nov. 30, 2021. English translation provided.

* cited by examiner

| Destination | Gateway | Genmask | Iface | |
|---|---|---|---|---|
| Host | * | 255.255.255.255 | eth0 | ···(a) |
| 127.0.0.1 | * | 255.0.0.0 | lo | ···(b) |
| 192.168.20.0 | * | 255.255.255.0 | ath0 | ···(c) |
| Default | 192.168.1.253 | 0.0.0.0 | eth0 | ···(d) |
| 172.32.0.0 | 192.168.20.253 | 255.255.0.0 | ath0 | ···(e) |

901  902  903  904

INFORMATION PROCESSING APPARATUS, CONTROL METHOD OF INFORMATION PROCESSING APPARATUS, AND STORAGE MEDIUM

BACKGROUND OF THE INVENTION

Field of the Invention

The present invention relates to an information processing apparatus, a communication control method of an information processing apparatus, and a communication control program, and more particularly to a communication method of an information processing apparatus including a plurality of communication interfaces and connected to a plurality of networks simultaneously.

Description of the Related Art

In recent years, an environment in which a plurality of local area networks (LANs) are separately used, such as an in-house internal connection and external connection such as the Internet, has become general due to forms of use of an information processing apparatus and a difference in security policy required for a network. Therefore, in a single information processing apparatus such as a printer, a multifunction peripheral, or the like, an apparatus including a plurality of communication interfaces is being manufactured. For example, an operation in which a wired LAN is set to a first communication interface (hereinafter, a main line), and a wireless LAN is set to the other communication interface (hereinafter, a sub line) can be seen.

In addition, in a printer or a multifunction peripheral, an apparatus management systems that periodically transmits information related to an information processing apparatus, such as consumables information, an error occurrence situation, and counter information as an operation history to an external management server, and remotely surveils and manages the information processing apparatus is spreading. For example, a network system that notifies a failure occurring in a printing device to a management device connected to each communication interface in a printing device including a plurality of communication interfaces, has been devised (Japanese Patent Laid-Open No. 2007-94455). Japanese Patent Laid-Open No. 2007-94455 proposes a method of delivering failure notification information by failure notification management information including specific information for deciding a type of a communication interface to be used for each management device to be a notification destination.

However, in a technique of the related art disclosed in Japanese Patent Laid-Open No. 2007-94455, it is difficult to control a routing according to a network function since a communication interface is determined by a destination-based routing setting. That is, in a case where an information processing apparatus including a plurality of communication interfaces starts communication with an external device connected to the network, it is necessary to determine to which communication interface the packet is to be transmitted. As a basic routing rule, matching determination (longest matching specification) between a network address of the destination and an IP address of a transmission source interface is used. This is because in a case where the network address to which the destination IP address belongs matches each IP address allocated to the communication interface of the transmission source, transmitting from a communication interface with the larger number of matching bits is a more preferable route selection. Therefore, depending on the IP address of the destination and the IP address allocated to each communication interface of the transmission source, there may be a case where a communication interface that is unintended by the transmission source is selected on the basis of the longest matching rule and communication is performed.

Here, in an information processing apparatus including a plurality of communication interfaces, it is conceivable to construct a network environment that secures security by dividing a segment between networks that perform normal work and specific work. In a case where the network environment that secures security by dividing the segment is constructed as described above, depending on a network function that the information processing apparatus is about to realize, there is concern that a desired function is not able to be realized since an appropriate routing is not able to performed. For example, in a case where the apparatus management system shown in the related art is configured by using a cloud on the Internet, the information processing apparatus needs to perform communication through an external network, but in a configuration in which the main line is limited to an in-house LAN, there is concern that the sub line is not selected correctly. In addition, for example, in a case of a transmission function of converting a document scanned by an MFP into an electronic file and transmitting the electronic file to a user connected to an in-house LAN by e-mail, it is necessary to limit communication to that through the main line operated as the in-house LAN in order to avoid leakage of information outside of a company.

SUMMARY OF THE INVENTION

The present invention provides an information processing apparatus capable of easily setting which communication interface a predetermined network function uses.

An apparatus of an embodiment of the present invention is

According to the present invention, it is possible to provide the information processing apparatus that is able to easily set which communication interface the network function uses.

Further features of the present invention will become apparent from the following description of exemplary embodiments (with reference to the attached drawings).

DESCRIPTION OF THE EMBODIMENTS

Hereinafter, best modes for implementing the present invention will be described with reference to the drawings and the like.

First Embodiment

Figure 1:
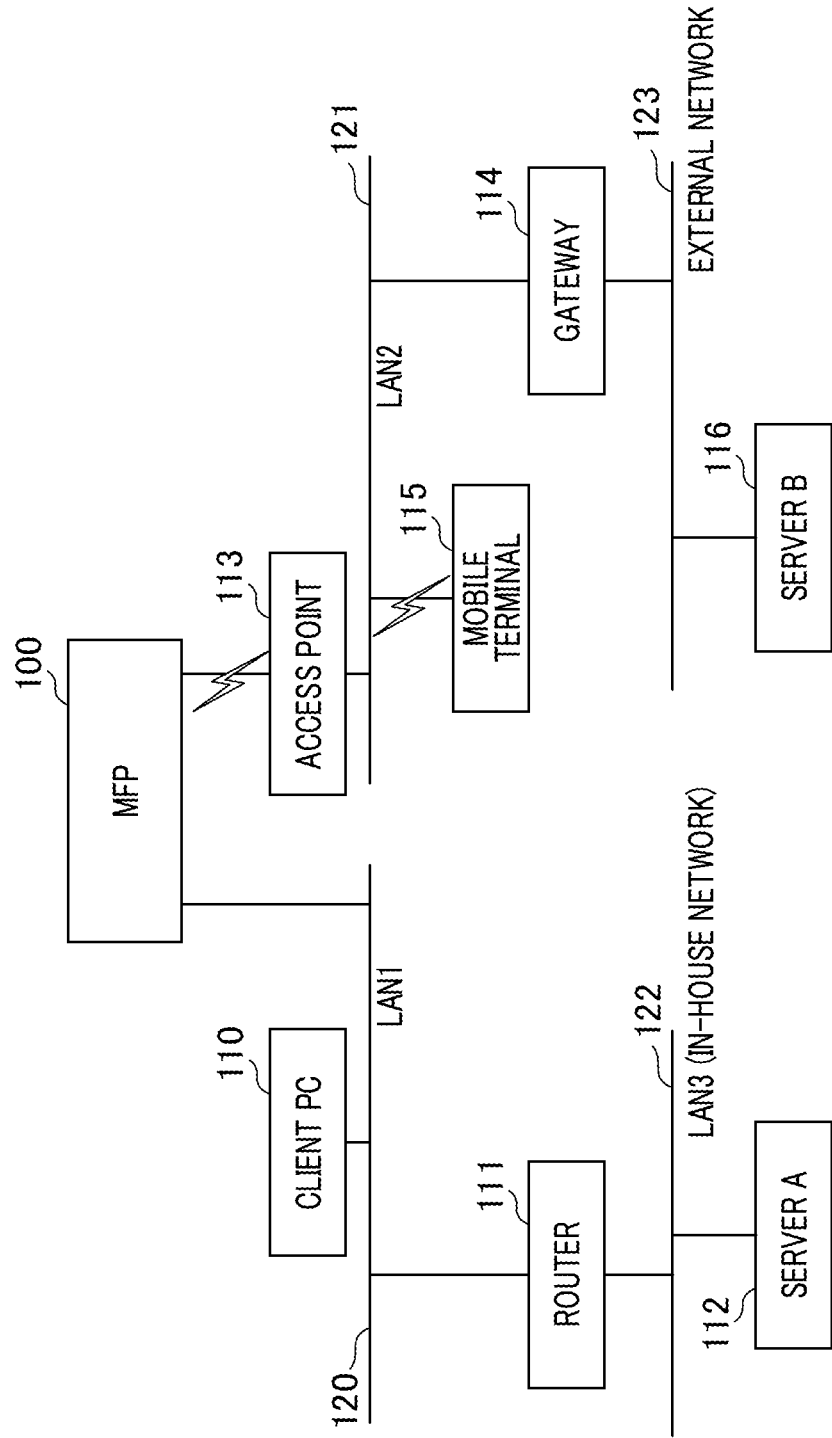
FIG. 1 is a diagram illustrating a network configuration.

FIG. 1 is a configuration diagram of networks 120 and 121 to which a multifunction peripheral (MFP) 100 according to the present exemplary embodiment is connected through a plurality of communication interfaces. The MFP 100 is connected to a client PC 110 through a local area network (LAN) 1 (120). The client PC 110 transmits a print job to the MFP 100 through a LAN 120. The LAN 1 (120) is further connected to a LAN 3 (122) through a router 111 to construct a network dedicated to a company, and is not connected to any external network such as the Internet. The server 112 is, for example, a dynamic host configuration protocol (DHCP) server, and allocates an IP address to the MFP 100 and the client PC 120.

A wireless LAN access point (hereinafter, AP) 113 is an access point that provides wireless communication compliant with the IEEE 802.11 standard to a client terminal. The MFP 100 is connected to the AP 113 in a wireless infrastructure mode and participates in the LAN 2 (121) through the AP 113. A mobile terminal 115 is also connected to the LAN 2 (121) through the AP 113, and the mobile terminal 115 is able to transmit the print job to the MFP 100 through the LAN 2. In addition, the LAN 2 is connected to the external network (Internet) 123 through a gateway 114.

A server B 116 is an apparatus management device that collects and stores apparatus configuration information, print job history, and information on consumables (hereinafter, referred to as apparatus management information) of the MFP 100, and operates as various servers such as an HTTP, an SMTP, and the like according to a protocol that communicates with the MFP. In addition, the apparatus management information is acquired from the MFP 100 through the LAN 2 (121) and the Internet 123.

Figure 2:
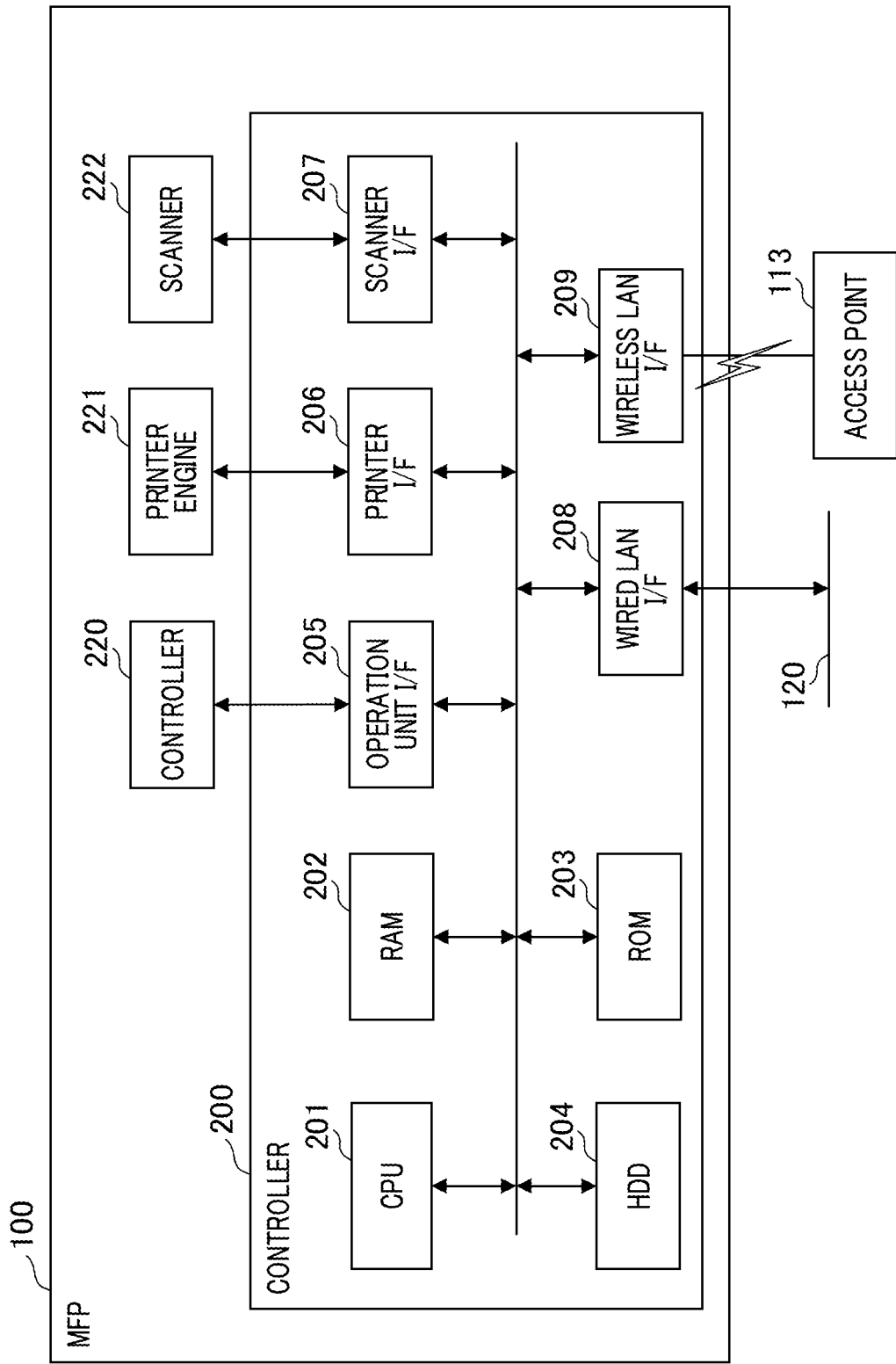
FIG. 2 is a diagram illustrating a hardware configuration of an MFP.

FIG. 2 is a diagram illustrating a hardware configuration of the MFP 100. A control unit 200 including a central processing unit (CPU) 201 controls operation of the entire MFP 100. The CPU 201 reads and executes a control program stored in a storage such as a read only memory (ROM) 203 or a hard disk drive (HDD) 204 and performs various types of control such as communication control and an image process. A random access memory (RAM) 202 is used as a temporary region of a main memory, work area, and the like of the CPU 201. The HDD 204 is nonvolatile storage unit for storing data, various programs or various information tables, and is also used for temporarily storing image data generated by a print or copy process. The control unit 200 including the CPU 201 functions as a computer that performs various types of control of the MFP 100.

A printer I/F (interface) 206 connects a printer engine 221 (hereinafter, printer) and the control unit 200 with each other. The printer 221 forms an image on a sheet fed from a paper feed cassette (not shown) on the basis of the image data input through the printer I/F 206. The printer 221 may employ an inkjet method of discharging ink onto a sheet to print an image or an electrophotographic method of fixing a toner on a sheet to print an image.

A scanner I/F 207 connects a scanner 222 and the control unit 201 with each other. The scanner 222 reads a placed document and generates image data. The image data generated by the scanner 222 is printed by the printer 221, stored in the HDD 204, or transmitted to an external device through a wired LAN I/F 208 or a wireless LAN I/F 209. An operation unit I/F 205 connects an operation unit 220 and the control unit 201 with each other. The operation unit 220 functions as an acceptance unit for performing various settings of the MFP 100, or functions as an operation panel (display unit) for displaying a state of an apparatus.

The CPU 201 realizes communication with a device on the LAN 1 and the LAN 3 through the wired LAN I/F 208. Through this wired communication, for example, the MFP 100 is also able to transmit the image data generated by the scanner 222 to the client PC 110. In addition, the wireless LAN I/F is an interface for performing wireless communication compliant with the IEEE 802.11 standard. The CPU 201 realizes communication with a device on the LAN 2 and the external network 123 through the wireless LAN I/F 209.

Figure 3:
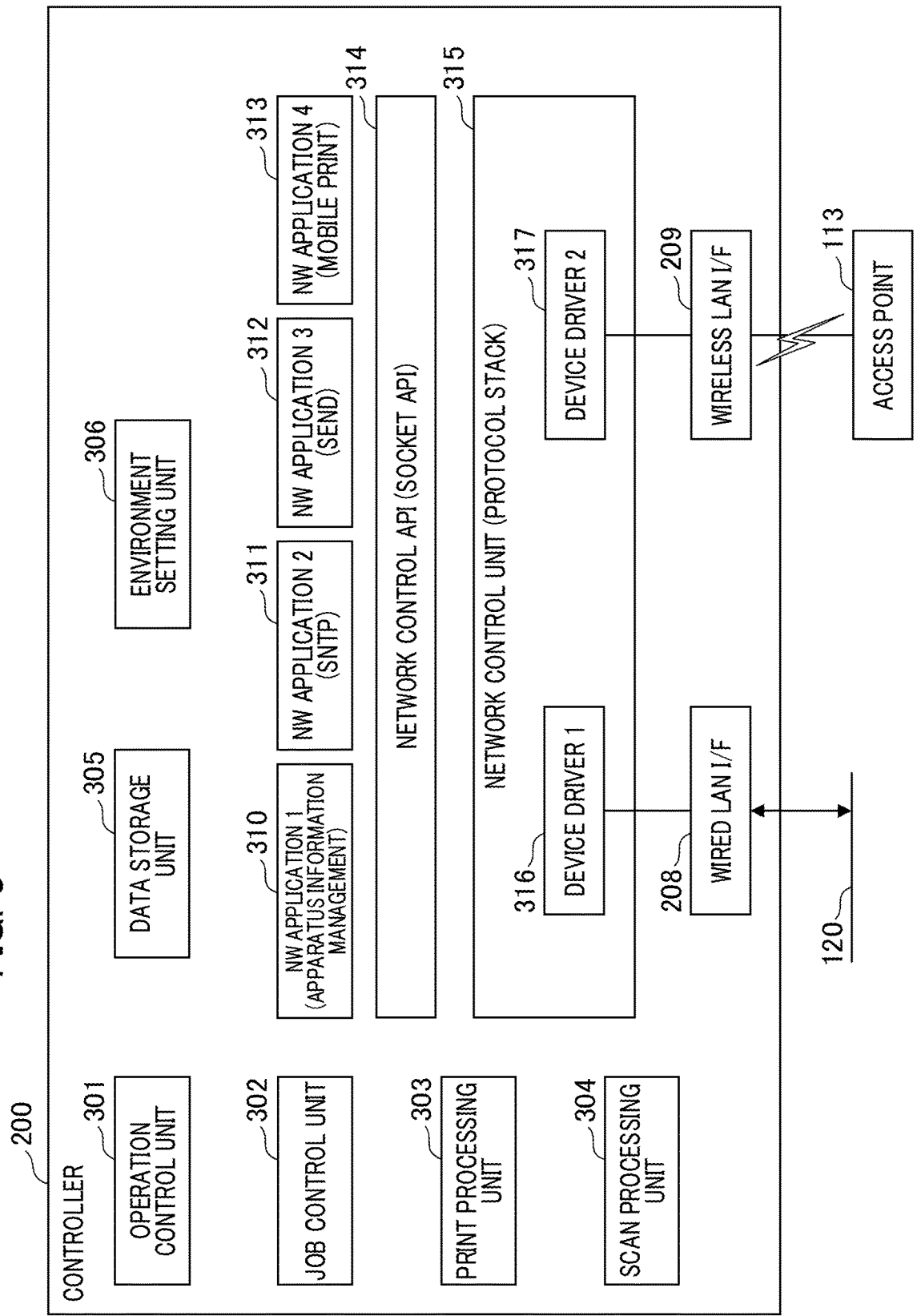
FIG. 3 is a diagram illustrating a software configuration of the MFP.

FIG. 3 is a block diagram illustrating a structure of software executed by the control unit 200 of the MFP 100. The software executed by the control unit 200 is realized by executing the program stored in the ROM 203 or the HDD 204 after the CPU 201 reads the program stored in the ROM 203 or the HDD 204 into the RAM 202. The operation control unit 301 displays a screen image for a user on the operation unit 220, detects user operations, and executes a process associated with a screen component such as a button displayed on the screen.

A data storage unit 305 stores and reads data such as a setting value in and from the ROM 203 based on a request from another control unit. For example, in a case where the user wishes to change a certain apparatus setting, the operation control unit 301 detects a content input by the user on the operation unit 220, and the data storage unit 305 stores the content in the ROM 203 as the setting value in response to the request from the operation control unit 301. According to the setting value stored in the data storage unit 305, an environment setting unit 306 performs various settings for the print and copy functions of the MFP 100 in addition to the network setting such as the IP address at the time of system startup and setting change detection.

NW application 1 (310) to NW application 4 (313) are applications that operate on the MFP 100 as a function realized using a network as a service providing unit. The NW application 1 (310) is an application performing management of the apparatus information, which collects and outputs the information on the apparatus configuration or the consumables of the MFP 100 in response to a request from an external device such as the PC 110. In the present exemplary embodiment, the NW application 1 (310) is configured as an SNMP agent that outputs the apparatus information in a form of a management information base (MIB) according to a simple network management protocol (SNMP) defined in RFC1157.

The NW application 2 (311) is an SNTP client that performs clock setting of the MFP 100 according to a simple network time protocol (SNTP) for synchronizing a time of the apparatus through the network. The NW application 3 (312) is an application that outputs the image file stored in the HDD 204 by the scanning process or the like to an external device by e-mail or file sharing. That is, the NW application 3 (312) is an application that outputs the image file to an external device according to simple mail transfer protocol (SMTP) or server message block (SMB) protocol. In the following, for the sake of simplicity, the NW application 3 (312) is referred to as file transmission.

The NW application 4 (313) is an NW application that receives print data through the wireless LAN I/F (209) according to an Internet printing protocol (IPP) by a print instruction of the mobile terminal 115. In the present exemplary embodiment, for sake of description, the above-described four NW applications are configured to operate, but the present invention is not limited to four and the present invention can be applied to any NW application as long as the NW application is an application that realizes the functions of the MFP 100 using the network function.

A network control unit 315 is a protocol stack as a group of programs in which roles of software are hierarchically accumulated for each protocol for realizing the network function, and is configured as a part of an OS that comprehensively controls the control unit 200. The protocol stack is configured of each layer conforming to an OSI reference model. Specifically, the protocol stack is configured of a session layer that performs connection control and the like, a transport layer that manages data transport, a network layer that controls address management and route selection, and a data link layer that identifies or transmits data frames. Here, it is assumed that the network control unit 315 allocates "eth0" as a name of a logical network interface for controlling the wired LAN I/F 208. In addition, it is assumed that the network control unit 315 allocates "ath0" as a name of a logical network interface for controlling the wireless LAN I/F 209.

In addition, the protocol stack includes a device driver 1 (316) that controls hardware of the wired LAN I/F 208 and a device driver 2 (317) that controls hardware of the wireless LAN I/F 209. A network control application program interface (API) 314 is an API library for calling a protocol stack included in the network control unit 315, and is included in the OS as a general socket function. The environment setting unit 306 and the NW application 1 (310) to NW application 4 (313) call the network control unit 315 by setting and calling a parameter in the network control API 314, and perform various network settings and data communication.

A job control unit 302 performs overall control of job execution of the functions such as copying, printing, and file transmission included in the MFP 100. In accordance with an instruction from the job control unit 302, a print processing unit 303 interprets received print data, generates image data, and prints and outputs the image data on a paper medium through the printer I/F 206. In accordance with an instruction from the job control unit 302, the scan processing unit 304 reads an installed document through the scanner I/F 207, and stores the document in the HDD 204 as a scan image. Note that the print processing unit 303 also reads the scan image stored by the scan processing unit 304 and prints the scan image on a paper medium. For example, in a case where the copy function is executed, the operation control unit 301 detects a request to start the copy function and instructs the job control unit 302 to perform copying. The job control unit 302 instructs the scan processing unit 304 to read the document, and acquires the scan image. The job control unit 302 instructs the print processing unit 303 to perform printing on a paper medium and output the paper medium as a copy result.

Figure 4A:
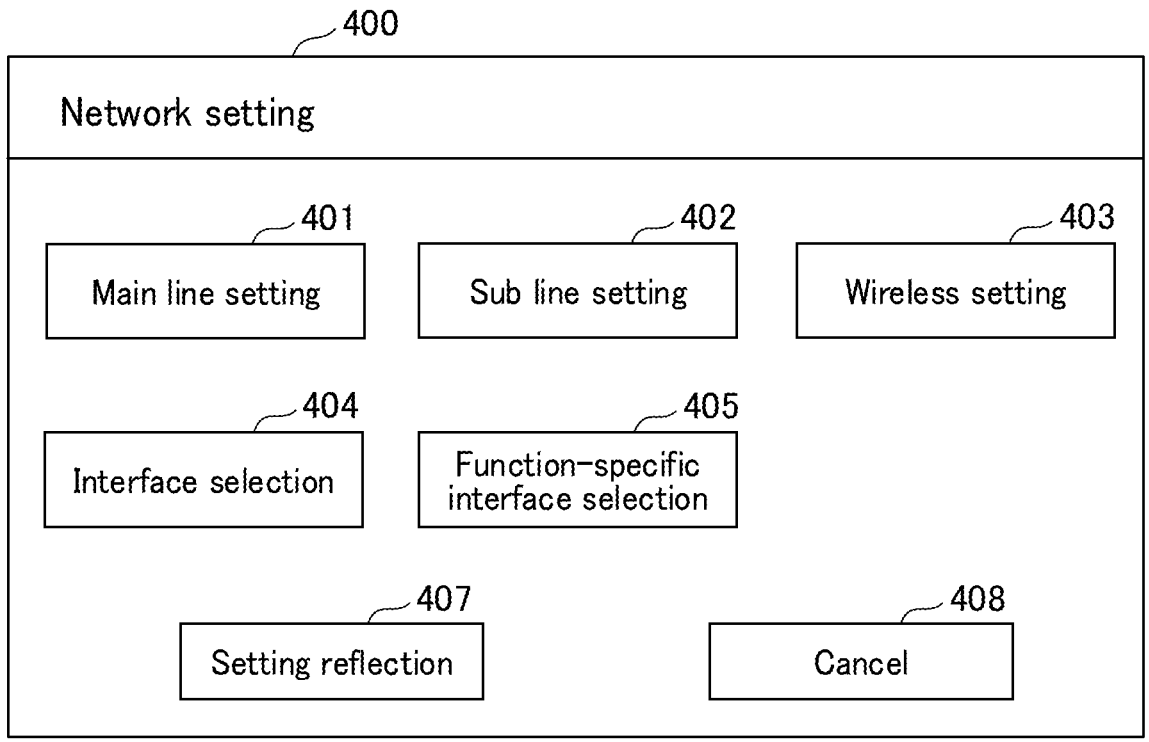
FIGS. 4A and 4B are diagrams illustrating a UI screen according to a first exemplary embodiment.

FIG. 4A is a menu screen 400 for performing various network settings displayed on the operation unit 220. A screen is moved to a lower layer menu setting screen of each menu by detecting pressing operation by the user of each of buttons (401 to 405) displayed on the screen. Here, the display control of the menu screen 400 and the detection of the button pressing are performed by the operation control unit 301.

The button 401 is a button for a transition to a main line setting screen (not shown), and on the main line setting screen, it is possible to set an address such as an IP address, a subnet mask, and a default gateway, for a main line. The button 402 is a button for a transition to a sub line setting screen (not shown), and in the sub line setting screen (not shown), it is possible to set an address such as an IP address, a subnet mask, and a default gateway, for the sub line. The button 403 is a button for a transition to a wireless setting screen (not shown), and on the wireless setting screen, it is possible to perform authentication setting for the wireless infrastructure mode such as a service set identifier (SSID) of an access point.

Figure 4B:
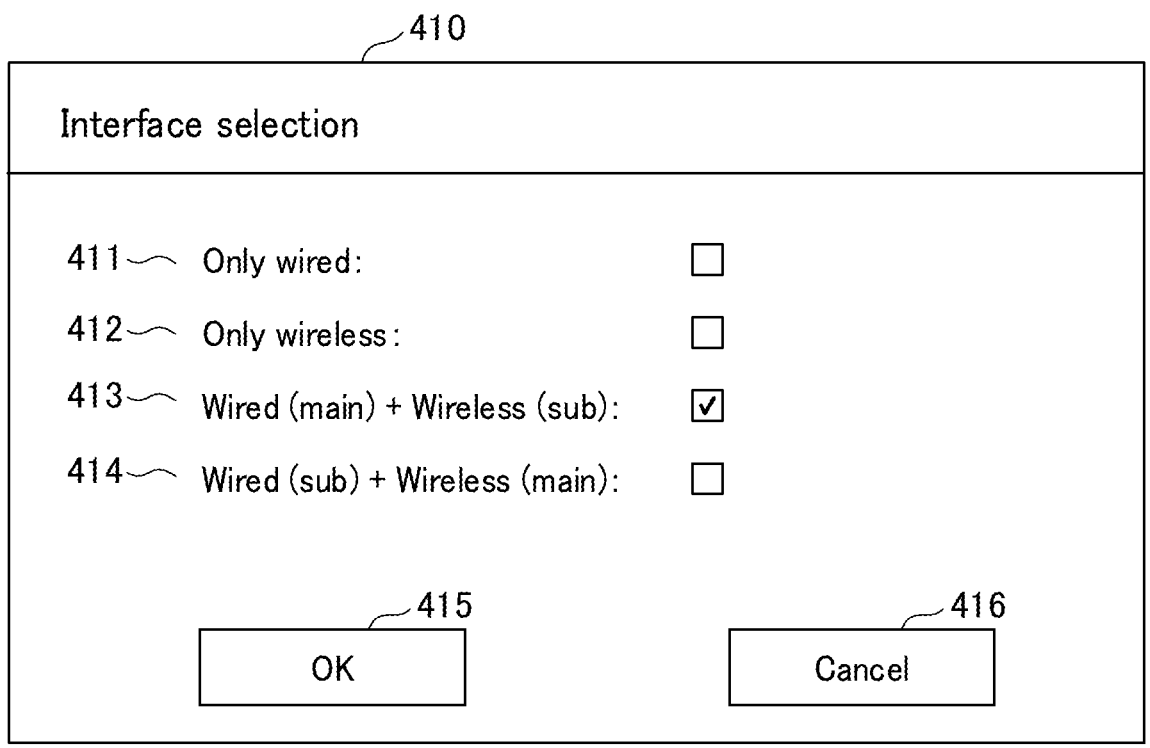

The button 404 is a button for a transition to an interface selection screen 410 (FIG. 4B) that will be described later. The button 405 is a button for a transition to a function-specific interface selection screen 420 (FIG. 5) that will be described later. In a case where both the main line and the sub line are set to an active state, the button 405 is able to be selected on the screen 410 (FIG. 4B). For example, the button 405 is able to be selected in a case in which both wired communication and wireless communication are set. In a case where pressing of a setting reflection button 407 is detected, the operation control unit 301 stores a setting value changed by the user in the data storage unit 305, and then instructs the environment setting unit 306 to reflect the setting.

FIG. 4B is the interface selection screen 410, which is used by the user to select the active state of the wired LAN and the wireless LAN infrastructure mode. In a case where the operation control unit 301 detects the pressing of the button 404 (FIG. 4A), the operation control unit 301 causes the display of the operation unit 220 to transit to the present screen. In the figure, in a case where only a wired check box 411 is selected, only the wired LAN operates and the wireless LAN infrastructure mode does not operate. In a case where only a wireless check box 412 is selected, only the wireless infrastructure mode operates and the wired LAN does not operate. In a case where a wired (main)+wireless (sub) check box 413 is selected, the wired LAN operates as the main line and the wireless LAN infrastructure mode operates as the sub line. In a case where a wired (sub)+wireless (main) check box 414 is selected, the wired LAN operates as the sub line and the wireless LAN infrastructure mode operates as the main line.

Regarding differences between the main line and the sub line, a priority is different in a case where either of operations is required to be stopped. That is, there is a possibility that the operation of the sub line is stopped in order to move the main line preferentially. In addition, although the operation as a communication line is not stopped, the setting is also able to be applied to a case where a provided service is partially stopped. Whichever choice of the check boxes 411, 412, 413, and 414 is selected, an active state of a wireless LAN ad hoc mode is not affected. The check boxes 411, 412, 413, and 414 are exclusive settings, and only one is able to be selected. In a case where pressing of an OK button 415 is detected, the operation control unit 301 stores a setting (hereinafter, IF selection information) selected by the user in the data storage unit 305 and then returns to the screen displaying the network setting 400. On the other hand, in a case where pressing of a cancel button 416 is detected, the operation control unit 301 does not perform the setting change and returns to the screen displaying the network setting 400.

Figure 5:
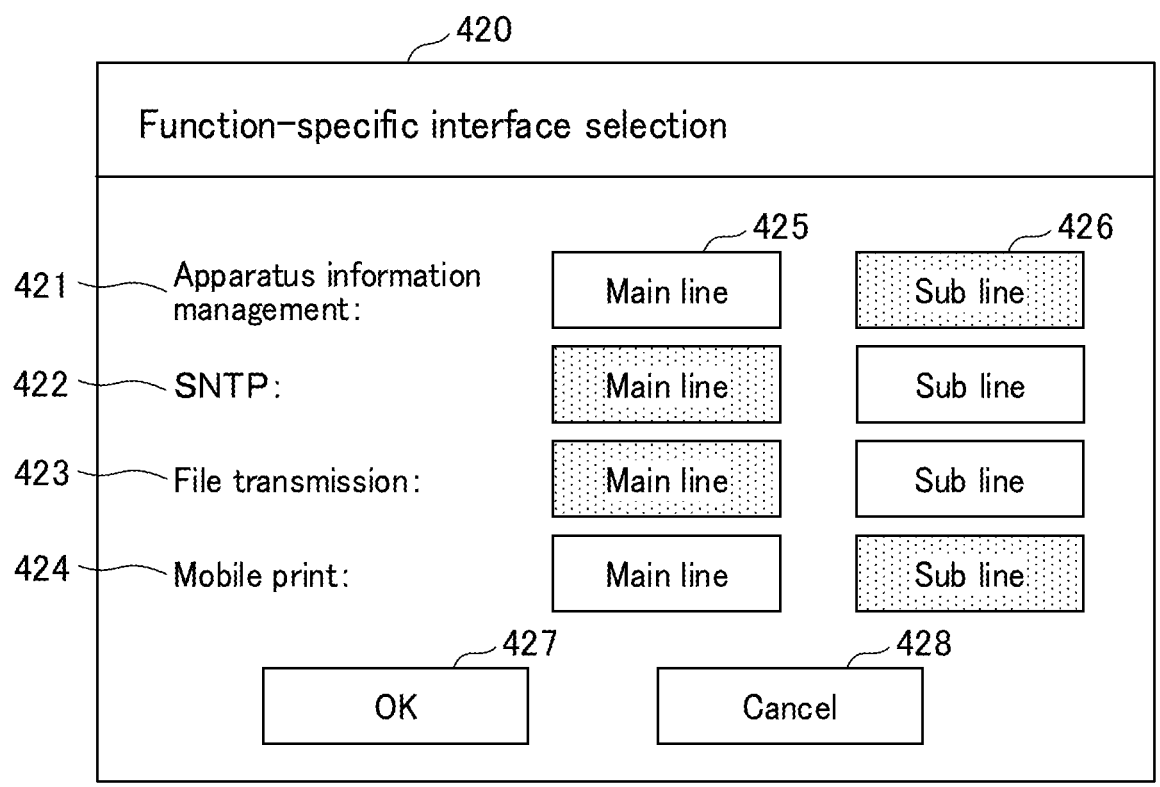
FIG. 5 is a diagram illustrating a UI screen according to the first exemplary embodiment.

FIG. 5 is an example of a menu screen for the user to select which of the main line and the sub line is used as an interface for each function realized by the NW application. In a case where the operation control unit 301 detects the pressing when the button 405 (FIG. 4A) is valid, the operation control unit 301 causes the display of the operation unit 220 to transit to the present screen. In the figure, a setting is a setting in which, for each function of an NW application 1 (apparatus information management) 421, a SNTP 422, file transmission 423, and mobile print 424, in a case where a button 425 is selected, the main line is used and in a case where a button 426 is selected, the sub line is used. The present exemplary embodiment shows an example in which the apparatus information management 421 and the mobile print 424 are set to use the sub line, and the SNTP 422 and the file transmission 423 are set to use the main line. Note that, in the present exemplary embodiment, the interface is able to be selected for the four types of NW applications, but the present invention is not limited thereto and can be applied to other NW applications.

In a case where the operation control unit 301 detects pressing of an OK button 427, the operation control unit 301 stores a setting (hereinafter, function-specific IF selection information) selected by the user in the data storage unit 305 and then returns to the screen displaying the network setting 400. The function-specific IF selection information stored in the data storage unit 305 is allocated to one storage region for each of the NW applications 421 to 424. On the other hand, in a case where pressing of a cancel button 428 is detected, the operation control unit 301 does not perform the setting change and returns to the screen displaying the network setting 400.

Figure 6:
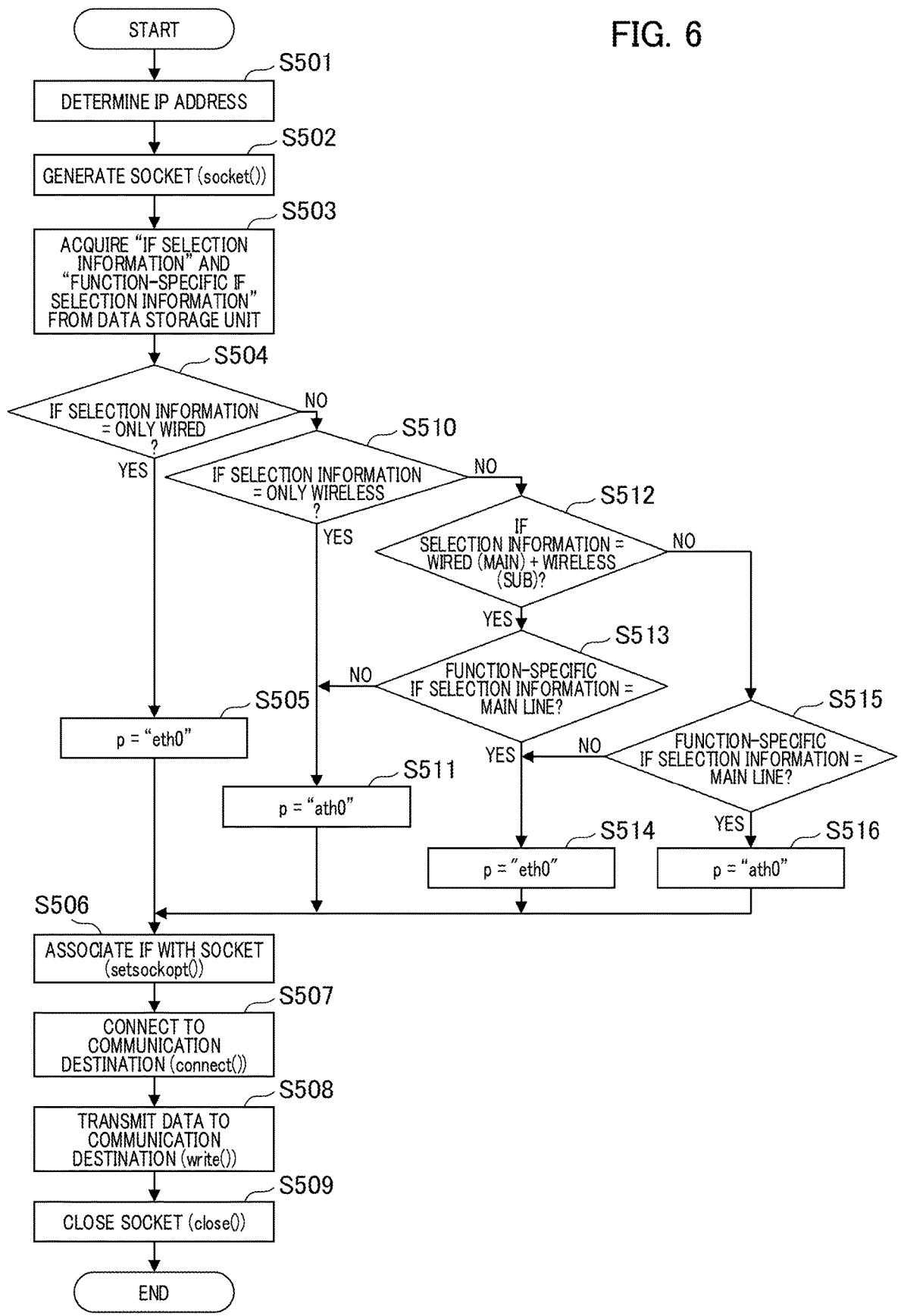
FIG. 6 is a flowchart illustrating a procedure of a communication IF selection according to the first exemplary embodiment.
Figure 9:
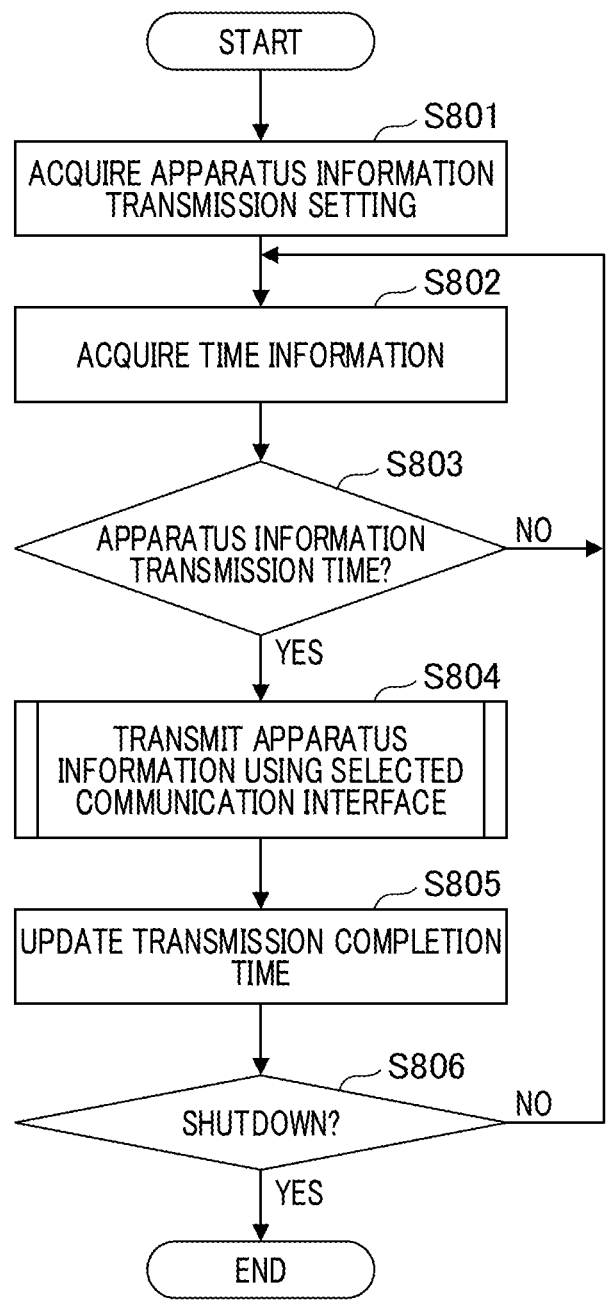
FIG. 9 is a flowchart illustrating a process of an apparatus information management application according to the second exemplary embodiment.

Hereinafter, a procedure to a time when the NW application 1 (310) selects an interface based on the setting of the function-specific interface selection screen 420 and performs communication will be described, with reference to flowcharts of FIGS. 6 and 9. Here, each process shown in the flowcharts of FIGS. 6 and 9 is realized by the CPU 201 executing the program stored in the ROM 203 or the HDD 204 after reading the program stored in the ROM 203 or the HDD 204 into the RAM 202. In the present exemplary embodiment, a case where the NW application 1 (310) communicates with the server B 116 connected to the external network 123 will be described, but a process of selecting the interface is similar to cases of the NW application 2 (311) to the NW application 4 (313), and thus detailed description thereof will be omitted.

First, in FIG. 9, the apparatus information management application (NW application 1 (310)) reads various types of setting information necessary for the operation of the apparatus information management application from the data storage unit 305 (step S801). The read setting information includes address information on a communication destination of the server B 116, an apparatus information type such as the consumables to be transmitted, a protocol type used for transmission, a transmission period, a transmission time, and a transmission completion time. For example, in a case where the transmission period and the transmission time are set to "every day 22:00", an apparatus information transmission process is scheduled so as to perform a transmission process once at 22:00 every day. Note that the setting information of the apparatus information management application except for the transmission completion time may be an initial value incorporated in a data portion of a program in advance or may be configured to be changeable from the menu screen of the operation unit 220. In addition, as the transmission completion time, zero indicating that it has not been transmitted is set as the initial value when power is turned on for the first time.

Next, the apparatus information management application (NW application 1 (310)) acquires the time information using a timer included in the OS (step S802). In addition, the time information is compared with the transmission period and the transmission time, and it is determined whether or not the time information reaches the transmission period and the transmission time (step S803). In a case where it is determined that the time information does not reach the transmission time (No), after setting a predetermined weight, the process returns to step S802. On the other hand, in a case where it is determined that the time information reaches the transmission time (Yes), the process proceeds to step S804. In addition, the apparatus information management application (NW application 1 (310)) selects the communication interface on the basis of the function-specific IF selection information stored in the data storage unit 305 and performs the transmission process of the apparatus information (step S804). Note that, details of a process procedure of step S804 will be described later with reference to FIG. 6. After completing the transmission process of the apparatus information, the transmission completion time is updated (step S805), and the process returns to step S802 (step S806) in order to continue the process unless shutdown is instructed. In addition, the transmission completion time is referred when a transmission result is stored in the HDD 204 as history information.

Next, the detailed procedure of the process shown in step S804 will be described with reference to the flowchart of FIG. 6. In step S501, the NW application 1 (310) determines the IP address of the server B 116 of the communication destination. In the present exemplary embodiment, the IP address of the server B 116 that performs apparatus information management is unchanged, and a value stored in the data storage unit 305 in advance is acquired. This is because the OS configuring the network control unit 315 does not perform name resolution on all of the communication interfaces. In general, since the IP address of the communication destination is able to dynamically perform the name resolution from a host name by a domain name system (DNS), the name resolution by DNS may be performed depending on the OS.

Next, the NW application 1 (310) calls a socket( )system call of the network control API 314 in order to start communication, and requests the network control unit 315 to generate a socket (step S502). PF_INET which means a use of a TCP/IP protocol family is designated in a first argument and SOCK_STREAM as a socket type is designated in a second argument. In the subsequent communication, control is performed by designating the socket generated here. After generating the socket, the NW application 1 (310) acquires the IF selection information (interface selection information) and the function-specific IF selection information of the corresponding NW application from the data storage unit 305 (step S503). In addition, after step S504, the interface associated with the socket is switched by values of the IF selection information and the function-specific IF selection information.

Note that the IF selection information and the function-specific IF selection information of the corresponding NW application acquired in step S503 are pieces of information obtained by the operation control unit 301 reading the value input to the user operation on the menu screen of the operation unit 220 shown in FIGS. 4B and 5 and storing in the data storage unit 305. Next, it is determined whether or not the IF selection information is a value indicating "only wired" (step S504). In a case where the IF selection information is the value indicating "only wired" (Yes), the NW application 1 (310) sets a character string "eth0" indicating the wired LAN I/F to a variable p holding the interface name associated with the socket (step S505). This corresponds to a case where "only wired" 411 is selected in FIG. 4B.

On the other hand, in a case where the IF selection information is not the value indicating "only wired" (No), the process proceeds to step S510, and it is determined whether or not the IF selection information is "only wireless" (step S510). In step S510, in a case where the IF selection information is a value indicating "only wireless" (Yes), a character string "ath0" indicating the wireless LAN I/F is set in the variable p holding the interface name (step S511). This corresponds to a case where "only wireless" 412 is selected in FIG. 4B.

On the other hand, in a case where the IF selection information is not "only wireless" in step S510 (No), the process advances to step S512 and it is determined whether or not the IF selection information is a value indicating "wired (main)+wireless (sub)" (step S512). In a case where the IF selection information is the value indicating "wired (main)+wireless (sub)" (Yes) in step S512, furthermore, it is determined whether or not the function-specific IF selection information is a value indicating "main line" (step S513). In step S513, in a case where the function-specific IF selection information is the value indicating "main line" (Yes), a character string "eth0" indicating the wired LAN I/F set as the main line is set in the variable p (step S514). This corresponds to a case where in a case where "wired (main)+ wireless (sub)" 413 is selected in FIG. 4B and the NW application is a case of the apparatus information management 421, "main line" 425 is selected in FIG. 5.

On the other hand, in a case where the function-specific IF selection information is not the value indicating "main line" in step S513 (No), a character string "ath0" indicating the wireless LAN I/F is set in the variable p (step S511). This corresponds to a case where in a case where "wired (main)+ wireless (sub)" 413 is selected in FIG. 4B and the NW application is the apparatus information management 421, "sub line" 426 is selected in FIG. 5. On the other hand, in a case where the IF selection information is not the value indicating "wired (main)+wireless (sub)" in step S512 (No), next, it is determined whether or not the function-specific IF selection information is the value indicating "main line" (step S515).

In a case where the function-specific IF selection information is the value indicating "main line" in step S515 (Yes), the process proceeds to step S516. Since the IF selection information is a value indicating "wired (sub)+ wireless (main)", the character string "ath0" indicating the wireless LAN I/F set as the main line is set in the variable p (step S516). On the other hand, in a case where the function-specific IF selection information is not the value indicating "main line" in step S515 (No), the character string "eth0" indicating the wired LAN I/F set as the sub line is set in the variable p (step S514). This corresponds to a case where "wired (sub)+wireless (main)" 413 is selected in FIG. 4B.

Next, the NW application 1 (310) calls a setsockopt( )system call included in the network control API 314 with reference to the variable p, and designates (associates) an interface to be used with respect to the network control unit 315 (step S506). Specifically, an identifier of the socket generated in step S502 is designated in the first argument. SOL_SOCKET indicating a level at which a socket option is defined is designated in the second argument. SO_BINDTODEVICE which means a connection of a socket interface as an option type set in the socket is designated in a third argument. A pointer to the variable p indicating the interface name selected according to the IF selection information and the function-specific IF selection information is designated in a fourth argument. The number of bytes of the character string designated in the fourth argument is designated in a fifth argument. The NW application 1 (310) is able to designate a desired communication interface to the network control unit 315 by using the API included in the network control API 314 as described above. In the present exemplary embodiment, since "wired (main)+wireless (sub)" is selected for the interface selection and "sub line" is selected for the function-specific interface selection for the apparatus information management 421, finally, the wireless LAN I/F that is the sub line is selected.

Next, in order to perform a connection to the server B (116), the NW application 1 (310) calls a connect( )system call with respect to the generated socket (step S507). In addition, a write( )system call is called to transmit data from the corresponding communication interface (step S508). In a case where the transmission is ended, a close( )system call is called to close the socket (step S509). Note that, since steps after step S507 are socket communication performed by a general client, details of arguments designated in a system call are omitted. In addition, for the sake of simplicity of description, description of an error process of a case where each system call fails in the process will also be omitted.

As described above, according to the present exemplary embodiment, it is possible to provide an information processing apparatus that selects an appropriate interface from a plurality of communication interfaces for each network function regardless of the IP address of the destination.

Second Embodiment

In the first exemplary embodiment, a configuration in which one of the plurality of communication interfaces is selected for each network function to be used in advance is shown. This is able to be applied to a case where a manager sets in advance as an initial setting according to the network configuration in which the MFP 100 is installed. In the present exemplary embodiment, in addition to the first exemplary embodiment, a case where a user using the MFP 100 dynamically selects a communication interface to be used during operation of a predetermined network function will be described. Note that, in the present exemplary embodiment, a hardware configuration of a premise device is the same as that of the first exemplary embodiment. A detailed description of the same configuration as that of the first exemplary embodiment will be omitted.

As an example in which it is desired to dynamically select a communication interface to be used while a user is using a predetermined network function, for example, a case where the network function is used in a division manner according to a destination of a transmission destination in a file transmission function for transmitting a document stored in the MFP 100 to the outside is considered. For example, a use division in which the main line is selected for storing the scanned image in the PC 110 connected to the in-house LAN in a normal operation, and on the other hand, the sub line is selected for a cloud service outside the company is considered.

Figure 7A:
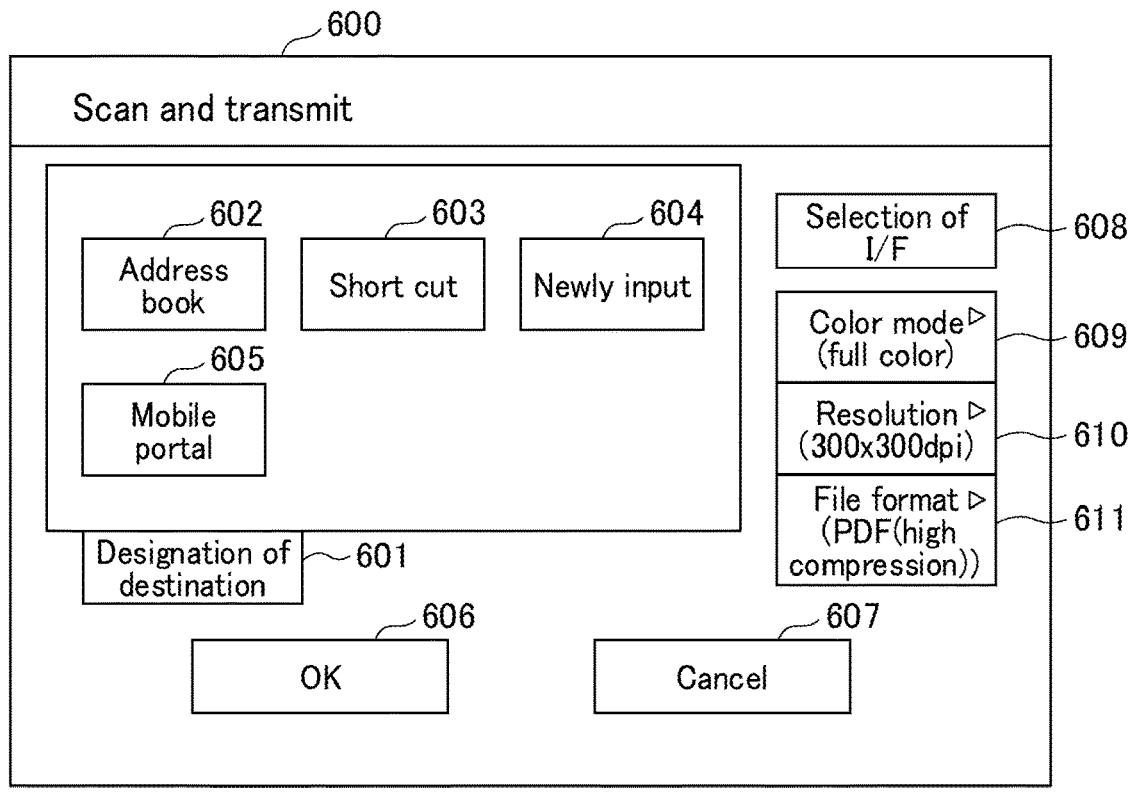
FIGS. 7A and 7B are diagrams illustrating a UI screen according to a second exemplary embodiment.

Hereinafter, a case of file transmission will be described with reference to FIGS. 7A, 7B, and 8. FIG. 7A is a menu screen 600 displayed on the operation unit 220 for performing the file transmission. In the present exemplary embodiment, a case where a document is scanned and transmitted is shown, but the present invention is also able to be applied to a case where image data registered as a box in the HDD 204 of the MFP 100 in advance by inputting a job from the PC is to be transmitted. Note that, the display control of the menu screen and the detection of the button pressing are performed by the operation control unit 301 similarly to the first exemplary embodiment, and the setting values designated by the user are stored in the data storage unit 305. In addition, the NW application 3 (312) performs actual file transmission control according to the setting stored in the data storage unit 305.

Buttons for mainly selecting a destination setting of the transmission destination, a format of a transmission file, and the interface to be used are displayed on a file transmission screen 600. A destination designation 601 includes a button 602 for transitioning to a screen for performing selection from a registered address book, a button 603 for transitioning to a screen for selecting frequently used destinations, a button 604 for new registration, and a button 605 for transitioning to a screen for designating a mobile terminal connected to a Wi-Fi connection. In addition to the e-mail address, a host name of a file sharing destination, and a telephone (fax) number, the destination includes a box number of a main body of the MFP 100, and a protocol when actual transmission is performed is determined according to the type of a selected destination.

In designating the format of the transmission file, a transition is performed to a screen for designating a color mode, resolution, and a file format by pressing each of a color mode 609, a resolution 610, and a file format 611. A button 608 is a button for a transition to a screen 620 (FIG. 7B) for selecting a communication interface to be used at a time of the file transmission. The operation control unit 301 transits the screen to the interface selection screen 620 in a case where the button pressing is detected, only in a case where the destination designated by the destination designation 601 is the e-mail or the host name (including a storage destination folder name). In a case of the fax or the box number other than the above, since the selection of the communication interface has no meaning, the button 608 is grayed out and thus is not able to be selected. In a case where pressing of an OK button 606 is detected, the operation control unit 301 stores the setting selected by the user in the data storage unit 305 and then instructs the NW application 3 (312) to start an actual file transmission process. On the other hand, in a case where pressing of the cancel button 416 is detected, the file transmission process is not performed and the screen returns to a menu top screen (not shown).

Figure 7B:
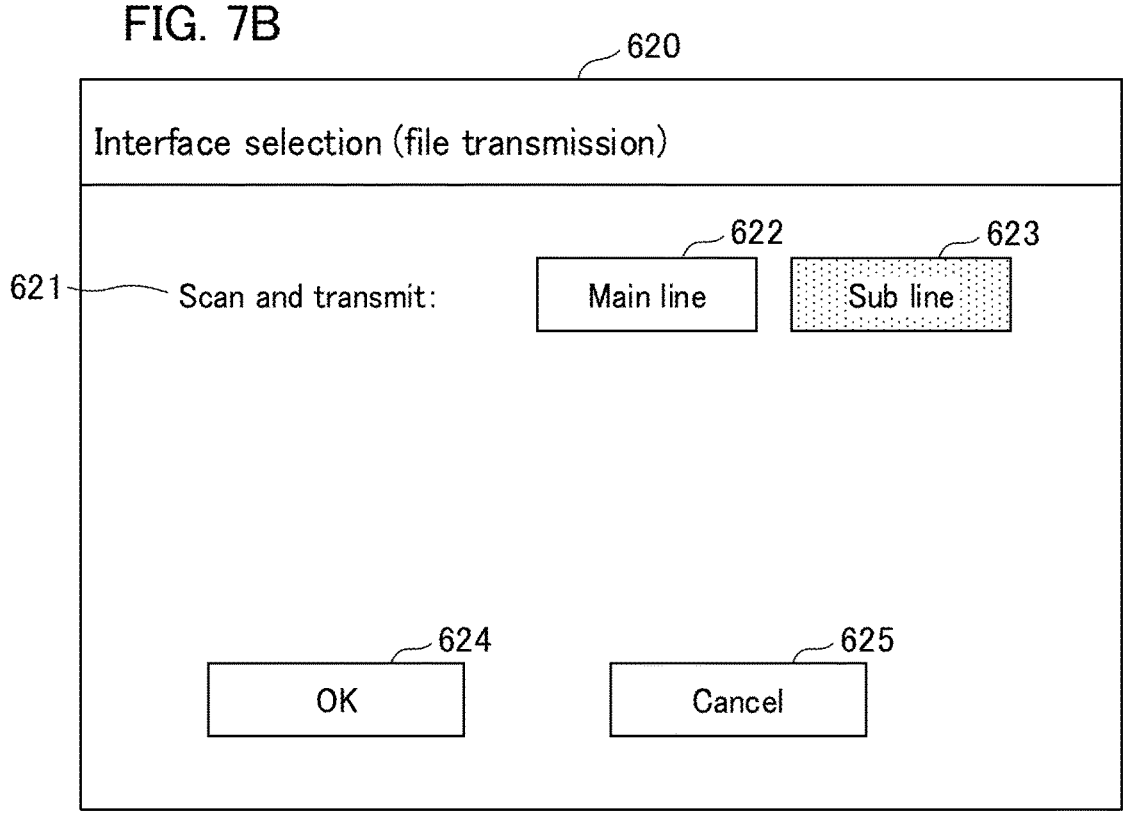
Figure 8:
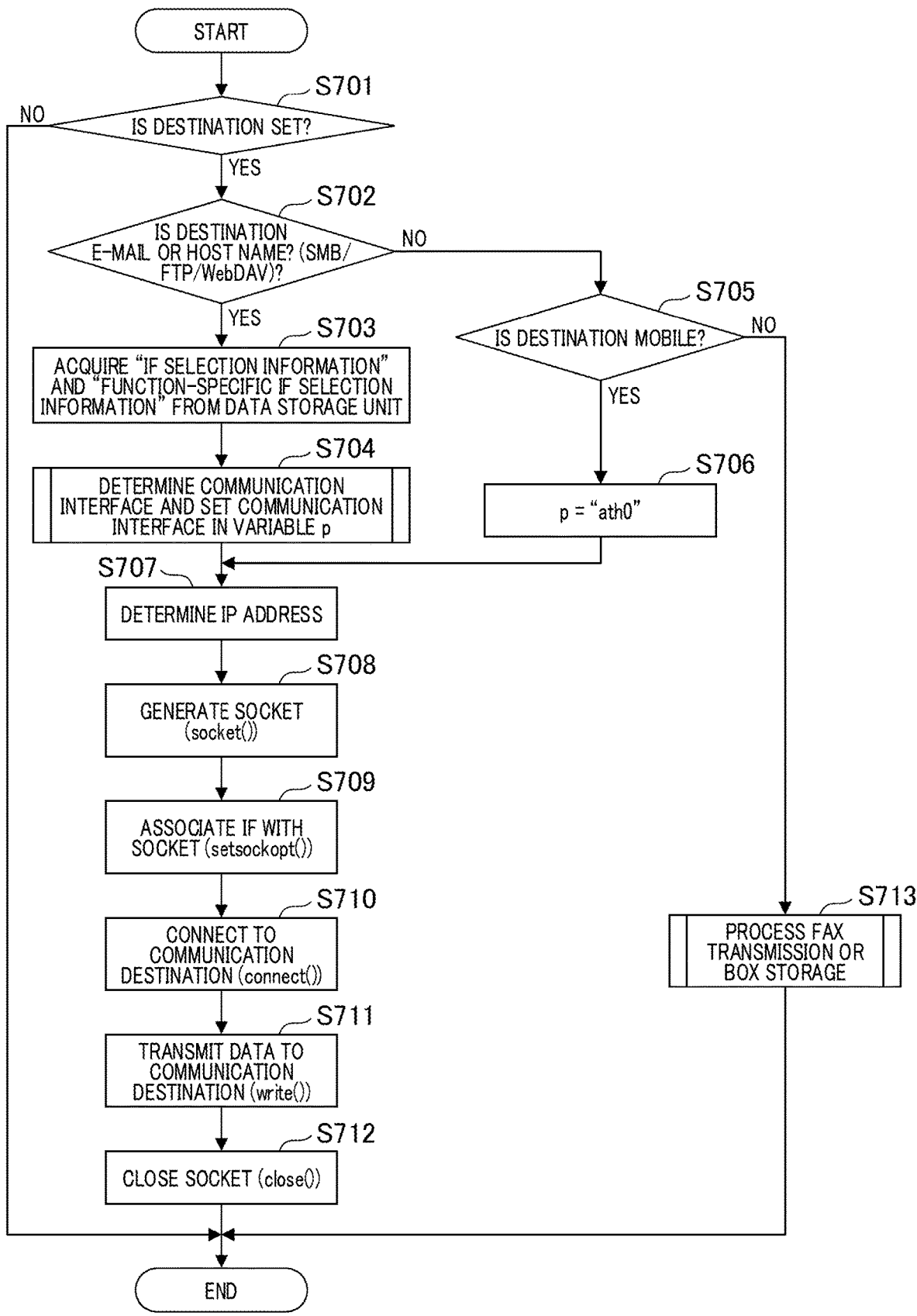
FIG. 8 is a flowchart illustrating a procedure of a communication IF selection according to the first exemplary embodiment.

FIG. 7B is an example of a menu screen for the user to select which of the main line and the sub line is used as the function-specific interface in the file transmission function controlled by the NW application 3. Similarly to a case of FIG. 5 of the first exemplary embodiment, in a case where the button 622 is selected, the main line is used, and on the other hand, in a case where the button 623 is selected, the sub line is used. Since the OK button 624 and the cancel button 625 are the same as the OK button 427 and the cancel button 428 of the first exemplary embodiment, the description thereof will be omitted.

Hereinafter, a procedure until the NW application 3 (312) selects the interface based on the setting of the interface selection screen 620 and performs the file transmission using the pressing of the OK button 606 as a trigger will be described with reference to a flowchart of FIG. 8. Here, each process shown in the flowchart of FIG. 8 is realized by the CPU 201 executing the program stored in the ROM 203 or the HDD 204 after reading the program stored in the ROM 203 or the HDD 204 into the RAM 202.

First, the NW application 3 (312) determines whether or not the destination of the file transmission is appropriately set (step S701), and in a case where the destination of the file transmission is not appropriate, the NW application 3 (312) ends a file transmission process. On the other hand, in a case where the destination is appropriate, it is determined whether or not the destination is the e-mail or the host name (step S702). In addition, in a case where the destination is the e-mail or the host name, the IF selection information and the function-specific IF selection information stored in the data storage unit 305 are acquired (step S703). Here, a value based on a result selected on the interface selection screen 620 shown in FIG. 7B is stored as the function-specific IF selection information. Note that, in the present exemplary embodiment, SMB, FTP, and WebDAV are supported as a file transmission protocol.

Since a process (step S704) of setting an interface name associated with the socket generated at a time of communication in the variable p (step S704) is the same as the process in steps S504 to S505 and steps S510 to S516 shown in FIG. 5 of the first exemplary embodiment, the description thereof will be omitted. In addition, since steps after notifying the network control unit 315 of the setting of the communication interface are also the same as those in the first exemplary embodiment, the description thereof will be omitted. Step S707 corresponds to step S501, step S708 corresponds to step S502, and each step of steps S709 to S712 corresponds to each step of steps S506 to S509.

On the other hand, in a case where the destination is neither the e-mail nor the host name in step S702, the NW application 3 (312) determines whether or not the destination is a mobile terminal through Wi-Fi (step S705). In a case where the destination is the mobile terminal through Wi-Fi in step S705, the character string "ath0" indicating the wireless LAN I/F is set in the variable p holding the interface name (step S706). In a case where the destination is not the mobile terminal through Wi-Fi in step S705, the job control unit 302 requests control to the job control unit 302 to end the process as the NW application 3 in order to perform FAX transmission or file storage process to the box (step S713).

As described above, according to the present exemplary embodiment, it is possible to switch the communication interface appropriately during the process of the file transmission function. Therefore, it is possible to select an appropriate communication interface according to the network to which the destination belongs, and it is possible to perform the process without failure in transmission.

Third Embodiment

In the first exemplary embodiment, a method of appropriately changing the route selection for each function by designating the communication interface to the network control API 314 each time the NW application (310 and 312) performs the communication process has been described. In the present exemplary embodiment, a method in which the network control unit 315 creates a routing table based on a setting values stored in the data storage unit 305 in advance and selects a communication interface based on the routing table will be described. Each of the NW applications (310 to 313) in a configuration of the present exemplary embodiment does not need to individually select the communication interface, and the route selection is performed by the network control unit 315 that is an OS.

Figures 10A, 10B:
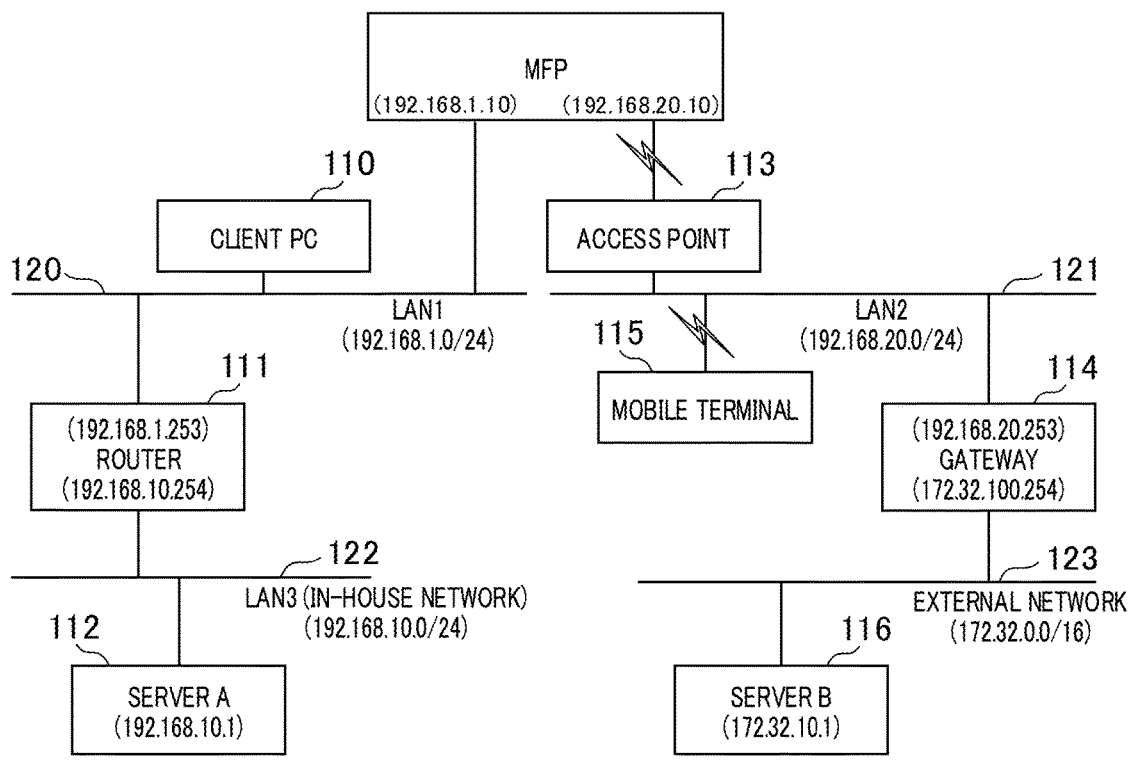
FIGS. 10A and 10B are diagrams illustrating a network configuration and a routing table.

FIG. 10A is a configuration diagram of a network to which the MFP 100 according to the present exemplary embodiment is connected, but the configuration itself is the same as FIG. 1 of the first exemplary embodiment, and for description, an example of the IP address with respect to a main host and a network is described. For example, 192.168.1.10 is set to the address of the wired LAN I/F 208 of the MFP 100, 192.168.20.10 is set to the address of the wireless LAN I/F 209, and 172.32.10.1 is set to the address of the apparatus management device (server B) 116. A network address of the LAN1 is 192.168.1.0/24, a network address of the LAN 2 is 192.168.20.0/24, a network address of the LAN 3 is 192.168.10.0/24, and a network address of the external network is 172.32.0.0/16. In addition, as a communication interface of the gateway 114, 192.168.20.253 is allocated to the I/F connected to the LAN2 (121), and an address of 172.32.100.254 is allocated to the I/F connected to the external network 123.

It is assumed that the CPU 201 updates the routing table according to the change in the network settings of the MFP 100 through the screen shown in FIGS. 4A and 4B or FIG. 5, the change in the IP address allocated from the DHCP server, and the like. In addition, in the present exemplary embodiment, regarding applications that communicate with a predetermined server such as the NW application 1 and the NW application 3, it is assumed that connection information (IP address or host name) to the server accessed by each application is stored as a device setting of a separate MFP 100. For example, it is assumed that an IP address or a host name (for example, 172.32.10.1) for accessing the apparatus management device (server B) 116 is stored in advance as the connection information related to the NW application 1. In addition, it is assumed that an IP address or a host name for accessing the SNTP server is stored in advance as the connection information related to the NW application 3. The CPU 201 constructs the routing table based on the stored connection information, the network setting, current network configuration information, and the like.

The MFP 100 connected to a network configuration shown in FIG. 10A generates the routing table based on connection information stored for each NW application, the network setting, and the like. FIG. 10B illustrates the routing table generated based on the network settings, the configuration information of the network, the connection information for each NW application stored in advance, and the like exemplified in FIGS. 4A and 4B and FIG. 5. The MFP 100 determines from which interface the data to be transmitted from each NW application to the outside is to be transmitted based on the generated routing table. In a case where communication is performed with the apparatus management device (server B) 116, it is possible to perform control so as to always go through the wireless LAN I/F 209 by using the routing table. In addition, in a case where communication is performed with the mobile terminal, it is possible to perform control so as to always go through the wireless LAN I/F 209 by using the routing table. In the figure, the routing table includes a destination address 901, a gateway address 902, a subnet mask 903 for specifying the network address part of the destination address 901, and an interface name 904 to be used.

In the present exemplary embodiment, five pieces of route information of entries (a) to (e) are registered. The entry (a) indicates the route to the MFP 100 itself, the entry (b) indicates the route to a local loop back lo that is a virtual interface, the entry (c) indicates the route to the LAN2 to which the MFP 100 belongs, and the entry (d) indicates the designation of the default gateway, respectively. Since the entries (a) to (c) are able to be transmitted from their own interfaces, "*" meaning that routing is not required is set in the gateway 902. The entry (c) is the route information registered for transmitting data related to mobile printing through the sub line, and defines that the data transmitted to the destination of 192.168.20.0/24 is transmitted through "ath0". In addition, all communications of an address destination that are not registered in the routing table are transmitted to 192.168.1.253 (that is, destination of the router of the main line), by the designation of the default gateway of the entry (d).

In addition, the entry (e) is the route information registered for communicating with the apparatus management device (server B) 116 through the wireless LAN I/F 209, and the network address (172.32.0.0/16) of an external network is set in the destination 901. In addition, the address 192.168.20.253 of the gateway 114 is set in the gateway 902, and "ath0" indicating the wireless LAN is set in the interface 904. Note that, in the present exemplary embodiment, a case where the network address of the external network is set as the destination of the entry (e) is exemplified, but the present invention is not limited thereto. For example, it is possible to set the IP address or the host name (for example, 172.32.10.1) for accessing the apparatus management device (server B) 116 as the destination of the entry (e). When performing communication according to an instruction from each NW application, the network control unit 315 refers to the routing table based on the designated destination address and narrows a candidate for the route. Note that, the routing table included in a general OS may have a member such as a metric indicating a priority order in addition to the above, but since the member is not directly related to the present exemplary embodiment, the description thereof is omitted.

Modification Embodiment

In the above-described exemplary embodiment, as an example, the MFP 100 includes the wired LAN I/F 208 and the wireless LAN I/F 209, but the present invention is not limited thereto. The present invention is able to be applied to an information processing apparatus including a plurality of communication interfaces. For example, the present invention is also able to be applied to an information processing apparatus including a plurality of wired LAN interfaces or an information processing apparatus including a plurality of wireless LAN interfaces. Furthermore, the wireless LAN interface is not limited to a wireless interface compliant with IEEE802.11. For example, the wireless LAN interface may be a wireless interface corresponding to low power wide area (LPWA) or a wireless interface for executing mobile data communication such as CDMA or LTE. For example, a communication method of the communication interface corresponding to the LPWA is able to adopt a communication method compatible with a standard such as IEEE 802.15.4 series, a communication method compatible with a standard such as LoRaWAN, Sigfox, LTE-M, or NB-IoT, or the like.

Other Embodiments

Embodiments of the present invention can also be realized by a computer of a system or apparatus that reads out and executes computer executable instructions (eg, one or more programs) recorded on a storage medium (which may also be referred to more fully as a 'non-transitory computer-readable storage medium') to perform the functions of one or more of the above-described embodiments and/or that includes one or more circuits (e.g, application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-010834, filed Jan. 25, 2018 which is hereby incorporated by reference wherein in its entirety.

What is claimed is:

1. An information processing apparatus having a plurality of functions including at least a first function for communicating with an external device and a second function different from the first function, the information processing apparatus comprising:
   a plurality of communication interfaces, wherein the plurality of communication interfaces includes a main communication interface having higher communication priority than a sub communication interface, and wherein an operation of the sub communication interface is stopped and an operation of the main communication interface with the higher priority continues in a case where either of operations is required to be stopped;
   at least one memory that stores a set of instructions; and
   at least one processor that executes the instructions to cause the information processing apparatus to perform operations comprising:
      setting one communication interface among the main communication interface and the sub communication interface as a device setting that indicates the communication interface used in the first function based on user operation via a setting screen;
      transmitting, in a case where the sub communication interface is set as the device setting that indicates the communication interface used in the first function, data generated by the first function via the sub communication interface to be used in the first function, even if the main communication interface is available;
      acquiring addresses of a plurality of external devices to be communicated with by the first function;
      storing the acquired addresses in a predetermined storage area; and
      registering a route information to transmit data through the communication interface to be used in the first function to the plurality of external devices identified by the acquired addresses, in a routing table, after the sub communication interface is set as the device setting that indicates the communication interface used in the first function.

2. The information processing apparatus according to claim 1, wherein the communication interface used for data transmission of the first function is determined based on the routing table.

3. The information processing apparatus according to claim 2, wherein data that is determined to be transmit to a default gateway based on the routing table is transmitted through the main communication interface.

4. The information processing apparatus according to claim 1, wherein the information processing apparatus is a printing apparatus and the first function is a printer management function for transmitting consumables information of the printing apparatus to an external server.

5. The information processing apparatus according to claim 4, wherein the printer management function periodically transmits consumables information of the printing apparatus to the external server based on a predetermined schedule.

6. The information processing apparatus according to claim 1, wherein the information processing apparatus is a printing apparatus and the first function is a printing function for communicating with an external device that provides print data to the printing apparatus.

7. The information processing apparatus according to claim 1, wherein the operations further comprise:
   setting a setting indicating one communication interface of the plurality of communication interfaces to function as the main communication interface, as an operational setting of the information processing apparatus based on user operation via the setting screen,
   wherein, in a case where the operational setting is a first setting, a first communication interface functions as the main communication interface and a second communication interface functions as the sub communication interface, and
   wherein, in a case where the operational setting is a second setting, the second communication interface functions as the main communication interface and the first communication interface functions as the sub communication interface.

8. A method of controlling an information processing apparatus having a plurality of communication interfaces, wherein the plurality of communication interfaces includes a main communication interface having higher communication priority than a sub communication interface, and wherein an operation of the sub communication interface is stopped and an operation of the main communication interface with the higher priority continues in a case where either of operations is required to be stopped, and a plurality of functions including at least a first function for communicating with an external device and a second function different from the first function, the method comprising:
   setting one communication interface among the main communication interface and the sub communication interface as a device setting that indicates the communication interface used in the first function based on user operation via a setting screen;

transmitting, in a case where the sub communication interface is set as the device setting that indicates the communication interface used in the first function, data generated by the first function via the sub communication interface to be used in the first function, even if the main communication interface is available;

acquiring addresses of a plurality of external devices to be communicated with by the first function;

storing the acquired addresses in a predetermined storage area; and registering a route information to transmit data through the communication interface to be used in the first function to the plurality of external devices identified by the acquired addresses, in a routing table, after the sub communication interface is set as the device setting that indicates the communication interface used in the first function.

9. A non-transitory computer readable storage medium storing a program that executes a method of controlling an information processing apparatus having a plurality of communication interfaces, wherein the plurality of communication interfaces includes a main communication interface having higher communication priority than a sub communication interface, and wherein an operation of the sub communication interface is stopped and an operation of the main communication interface with the higher priority continues in a case where either of operations is required to be stopped, and a plurality of functions including at least a first function for communicating with an external device and a second function different from the first function, the method comprising:

setting one communication interface among the main communication interface and the sub communication interface as a device setting that indicates the communication interface used in the first function based on user operation via a setting screen;

transmitting, in a case where the sub communication interface is set as the device setting that indicates the communication interface used in the first function, data generated by the first function via the sub communication interface to be used in the first function, even if the main communication interface is available;

acquiring addresses of a plurality of external devices to be communicated with by the first function;

storing the acquired addresses in a predetermined storage area; and registering a route information to transmit data through the communication interface to be used in the first function to the plurality of external devices identified by the acquired addresses, in a routing table, after the sub communication interface is set as the device setting that indicates the communication interface used in the first function.

* * * * *